United States Patent
Quintard et al.

(10) Patent No.: US 11,912,332 B2
(45) Date of Patent: Feb. 27, 2024

(54) STEERING WHEEL COVER AND VEHICLE STEERING WHEEL

(71) Applicant: Autoliv Development AB, Vargarda (SE)

(72) Inventors: Agnes Quintard, Lezay (FR); Emmanuelle Baloge, Rouille (FR); Rose Gauchot, Doux (FR); Thomas Letierce, Vouneuil s/Biard (FR)

(73) Assignee: Autoliv Development AB, Vårgårda (SE)

( * ) Notice: Subject to any disclaimer, the term of this patent is extended or adjusted under 35 U.S.C. 154(b) by 211 days.

(21) Appl. No.: 17/310,826

(22) PCT Filed: Feb. 17, 2020

(86) PCT No.: PCT/EP2020/054077
§ 371 (c)(1),
(2) Date: Aug. 25, 2021

(87) PCT Pub. No.: WO2020/173736
PCT Pub. Date: Sep. 3, 2020

(65) Prior Publication Data
US 2022/0135109 A1   May 5, 2022

(30) Foreign Application Priority Data
Feb. 26, 2019  (FR) ..................... 1901951

(51) Int. Cl.
*B62D 1/06* (2006.01)
*D05B 93/00* (2006.01)

(52) U.S. Cl.
CPC ............... *B62D 1/06* (2013.01); *D05B 93/00* (2013.01)

(58) Field of Classification Search
CPC . B62D 1/04; B62D 1/046; B62D 1/06; B62D 1/065; B62D 1/08; B62D 1/10; D05B 93/00; D05B 93/02
See application file for complete search history.

(56) References Cited

U.S. PATENT DOCUMENTS

| | | | | |
|---|---|---|---|---|
| 4,729,416 A | * | 3/1988 | Miller | B62D 1/06 74/558 |
| 9,139,217 B2 | * | 9/2015 | Bertrand | B62D 1/06 |
| 10,646,006 B2 | * | 5/2020 | Zhang | A44B 19/12 |
| 11,130,443 B1 | * | 9/2021 | Matsu | G02B 6/102 |

(Continued)

FOREIGN PATENT DOCUMENTS

| CN | 201065137 Y | * | 5/2008 |
|---|---|---|---|
| DE | 102007031014 A1 | | 1/2009 |

(Continued)

OTHER PUBLICATIONS

Machine Translation of WO-2016139739-A1.*

*Primary Examiner* — Adam D Rogers
(74) *Attorney, Agent, or Firm* — Matthew D. Thayne; Thayne and Davis LLC

(57) ABSTRACT

A composite cover for a vehicle steering wheel, comprising at least two adjacent parts connected to one another by at least one stitched seam connection, wherein the seam between the two parts comprises at least two seam finishing stitches, and the connection being free of stitching between the two finishing stitches, so as to allow the cover to be incised between the two finishing stitches.

13 Claims, 1 Drawing Sheet

(56) References Cited

U.S. PATENT DOCUMENTS

| | | | | |
|---|---|---|---|---|
| 2004/0262805 A1* | 12/2004 | Bostick | ................ | B29C 33/424 |
| | | | | 264/219 |
| 2014/0013898 A1* | 1/2014 | Doursoux | ................ | B62D 1/06 |
| | | | | 74/558 |
| 2014/0026711 A1* | 1/2014 | Bertrand | ................ | B62D 1/06 |
| | | | | 74/558 |
| 2020/0001911 A1* | 1/2020 | Card | ........................ | B32B 7/05 |
| 2020/0156690 A1* | 5/2020 | Nonoyama | ............. | B62D 1/04 |

FOREIGN PATENT DOCUMENTS

| | | | |
|---|---|---|---|
| DE | 102010053354 A1 | | 8/2011 |
| JP | S6137578 A | | 2/1986 |
| JP | 2018039446 A | * | 3/2018 |
| KR | 101506600 B1 | * | 3/2015 |
| WO | WO-2016139739 A1 | * | 9/2016 |
| WO | 2017116898 A1 | | 7/2017 |

* cited by examiner

[Fig. 1]
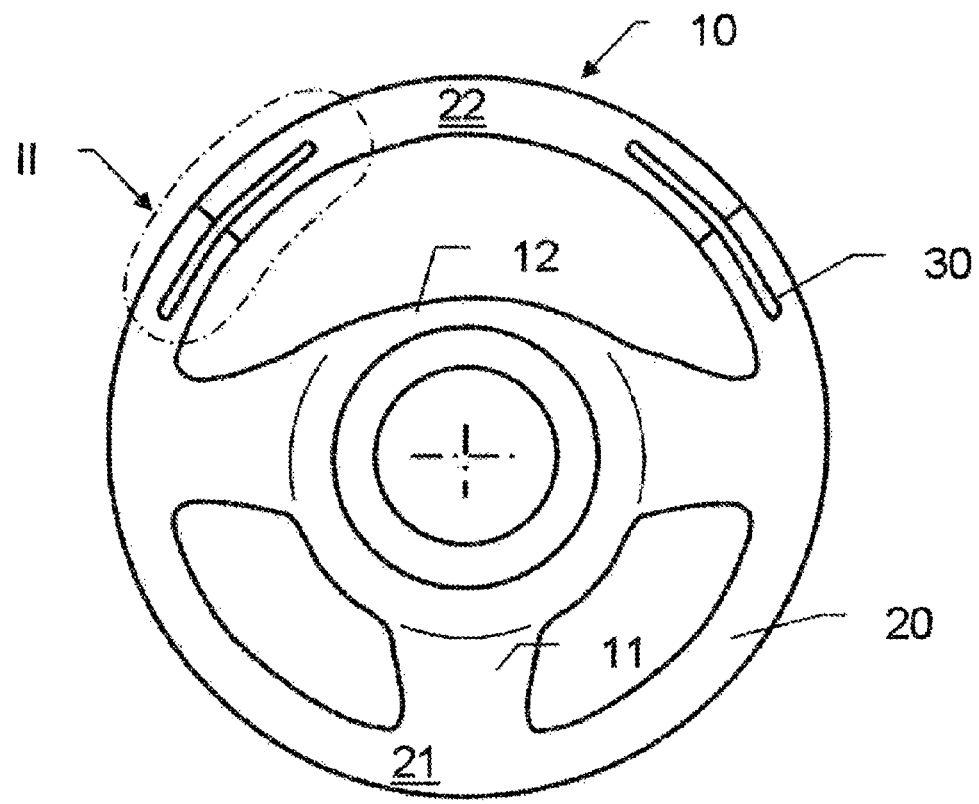
[Fig. 2]
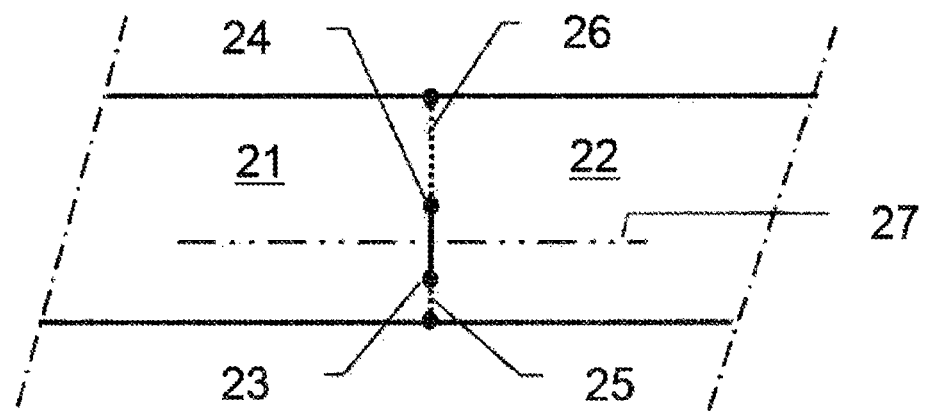

STEERING WHEEL COVER AND VEHICLE STEERING WHEEL

The present invention generally relates to a steering wheel cover mounted on an automotive vehicle steering wheel, and in particular the present invention relates to a composite steering wheel cover, namely one produced with several pieces of material sewn to one another, and the cover is provided to be incised once positioned on the steering wheel, for example in order to position an insert that passes through the cover.

STATE OF THE ART

Known in the prior art are steering wheels with covers traversed by inserts, as disclosed by document WO2017116898 A1. However, this system proposes no manufacturing solution in a case where the cover must comprise several adjacent parts, and in which the insert must extend from one to the other of those adjacent parts.

DISCLOSURE OF THE INVENTION

A purpose of the present invention is to address the abovementioned disadvantages of the prior art, and in particular, first of all, to propose a solution for a composite cover that thus comprises a connection between two adjacent parts of the cover, the cover being intended to be traversed by an insert that overlaps the connection between the two adjacent parts.

To that end, a first aspect of the invention relates to a composite cover for a vehicle steering wheel, comprising at least two adjacent parts connected to one another by at least one stitched seam connection,
characterized in that:
the seam between the two parts comprises at least two seam finishing stitches,
the connection is free of stitching between the two finishing stitches, so as to allow the cover to be incised between the two finishing stitches. Thus, the connection comprises a portion free of stitching that may then be incised or cut transversely, without however affecting the strength of the stitched seams.

Advantageously, the connection is free of stitching between the two finishing stitches, so as to allow the two adjacent parts of the cover to be incised between the two finishing stitches.

Advantageously, the connection is free of stitching between the two finishing stitches, so as to allow the two adjacent parts of the cover to be incised between the two finishing stitches, once the cover is positioned on the vehicle steering wheel.

Advantageously, the stitched seam connection comprises a stitched seam with four finishing stitches.

Advantageously, the stitched seam connection comprises two stitched seams with one finishing stitch for each, and preferably two finishing stitches.

In other words, one aspect relates to a composite cover for a vehicle steering wheel, comprising at least two adjacent parts connected to one another by at least one stitched seam connection,
characterized in that:
the stitched seam connection comprises two stitched seams with one finishing stitch for each, and preferably two finishing stitches,
the connection is free of stitching in an area between two ends of the two seams, each terminated by a finishing stitch, so as to allow the cover to be incised between the two finishing stitches.

Advantageously, the stitched seam connection extends along the transverse direction of the cover (when the cover is "flat," before being placed on the steering wheel), and the seam has a length less than the width of the cover, by at least 2 mm. In other words, over the width of the cover, along the junction between the two adjacent parts, a space of at least 2 mm is not sewn, and "gapes," with the result that an incision of the cover transverse to the stitched seam connection at that location will not cut the seam thread.

Advantageously, the seam between the two parts has a stitch length, and wherein the two finishing stitches are separated by a distance free of stitching strictly greater than the stitch length, and preferably the two finishing stitches are separated by a distance free of stitching of more than 1.5 times the stitch length. Thus, the connection comprises a portion free of stitching of a significant length, which enables a slot to be made by cutting.

Advantageously, the two finishing stitches are separated by a distance free of stitching of more than at least 2 mm. Thus, the connection comprises a portion free of stitching of significant length, which enables a slot to be made by cutting. In particular, the length considered makes it possible to provide a cut by a cutting tool with no risk of touching or cutting the finishing stitches.

Advantageously, the two finishing stitches are separated by a distance free of stitching of less than 8 mm, preferably less than 6 mm, and ideally less than 4 mm.

Advantageously, the connection has a connection direction transverse to the longitudinal direction of the cover.

Advantageously, the connection portion free of stitching is made in the midst of the cover, and/or at a predetermined distance from the longitudinal edges of the cover. In other words, the portion free of stitching bordered by the finishing stitches is at a location that will not be sewn when the cover is placed on the rim (sewn then along its longitudinal edges), with the result that this connection area free of stitching would gape open if no insert were then placed therein. Typically, the predetermined distance between the stitched seam a longitudinal edge of the cover will be greater than 15 mm.

Advantageously, the connection comprises two different stitched seams, separated by the connection portion free of stitching.

A second aspect of the invention concerns a vehicle steering wheel comprising:
a rim,
a cover according to the first aspect of the invention,
at least one insert mounted on the rim and traversing the cover through a slot made in the cover,
characterized in that the slot runs between the two finishing stitches.

Advantageously, the insert is arranged along at least one portion of arc of circle of the rim.

A third aspect of the invention relates to an automotive vehicle, comprising a steering wheel according to the second aspect of the invention.

A fourth aspect of the invention relates to a method of manufacturing a composite cover for vehicle steering wheel, the composite cover comprising two adjacent parts,
the manufacturing method comprising the steps consisting of:
sewing the two adjacent parts together to form a stitched seam connection, forming two finishing stitches, separated by a connection portion free of stitching, so as to allow a subsequent incision of the cover between the two finishing stitches.

A fifth aspect of the invention relates to a method of manufacturing a vehicle steering wheel, comprising the manufacturing method of the composite cover according to the fourth aspect, and comprising a step consisting in making an incision in the cover, in the midst thereof, running between the two finishing stitches and through the connection portion free of stitching. Consequently, the incision has two ends located in "the midst of the cover" of each of the adjacent parts.

Advantageously, the manufacturing method comprises a step consisting in mounting the insert on the rim, and making it pass through the incision.

DESCRIPTION OF THE FIGURES

Other characteristics and advantages of the present invention will become more apparent upon reading the detailed description of an embodiment of the invention, which is provided by way of example but in no manner limited thereto, and illustrated by the attached drawings, in which:

FIG. 1 shows a front view of a steering wheel comprising a cover according to the present invention;

FIG. 2 shows a detail view of the cover of FIG. 1.

DETAILED DESCRIPTION OF EMBODIMENT(S)

FIG. 1 shows a view of a steering wheel according to the present invention, comprising a rim 10 connected to a hub 12 by branches 11.

The rim 10 is covered by a composite cover 20 produced with two adjacent parts 21 and 22 (two pieces of fabric or of different materials). Consequently, there are two connections to be provided at the cover 20 in order to connect the two adjacent parts 21 and 22, at 10 o'clock and 2 o'clock for example. The two adjacent parts 21 and 22 may be of different colors, or even of different materials (leather, coated fabric, synthetic material, etc.).

In the present embodiment, each connection between the two adjacent parts 21 and 22 is more oriented along a radial direction of the steering wheel, but it is also quite possible to consider a connection more oriented along a horizontal line of FIG. 1.

Moreover, the steering wheel comprises two inserts 30, each visible to the driver of the vehicle. For example, it may be considered that the inserts 30 are light guides to send a light message to the driver, and a source of light may be installed inside the rim 10. Consequently, each insert 30 passes through the cover 20. The insert 30 may also be a decorative part or a metallized part used as electrode for example, in order to measure the heart rate of the driver.

As may be seen in FIG. 1, the inserts 30 are positioned overlapping the adjacent parts 21 and 22, i.e., they each overlap or cross a connection between these two adjacent parts 21 and 22 and their ends fall in "the midst of the cover" of these two adjacent parts 21 and 22.

FIG. 2 shows a view of detail II of FIG. 1, at the cover 20 during manufacture, i.e., "flat," in order to show in detail the connection between the adjacent parts 21 and 22. In fact, this connection must be provided in order to allow the insertion of an insert, while achieving a lasting hold (without risk of dislocation).

To that end, the connection between the adjacent parts 21 and 22 is accomplished by stitched seam, and two finishing stitches 23 and 24 are provided, each of which respectively finishes two different seams 25 and 26 (dotted lines) each of which starts from a longitudinal edge of the cover 20 when flat.

Consequently, it will be possible, when flat or on the rim 10, to make an incision 27 in the direction of the length of the cover 20 in FIG. 2, which goes from the part 21 to the part 22 without cutting a stitched seam, and therefore the ends are in the midst of the cover. Indeed, the two finishing stitches 23 and 24 are separated by at least 2 mm to achieve a portion of connection free of stitching (solid line).

A finishing stitch is a seam stitch making it possible to avoid the seam coming apart when tension is applied to the two pieces of fabric connected by the seam. Such a stitch may be produced by making a reverse seam over stitches already made, or by making an end-of-seam knot. Consequently, the area free of stitching is a punch-free area, and may just as well have the "un-sewn" sewing threads that run freely from one finishing stitch to the other (with an excess length, for example), as cutting them after a first point in order to restart a second seam further along with a finishing stitch and loose thread ends.

It should be noted that each stitched seam 25 and 26 may also comprise a finishing stitch at the edge (of each longitudinal edge of the cover in FIG. 2).

Thus, by providing two separate finishing stitches 23 and 24 in the midst of the cover (spaced away from the edges of the cover 20 when flat), it is possible to make an incision that traverses the stitched connection without affecting the strength, in order then to insert an insert 30 into the slot thus made.

It will be understood that various modifications and/or improvements which are obvious for the person skilled in the art may be made to the different embodiments of the invention described in this present description without departing from the scope of the invention.

The invention claimed is:

1. A composite cover for a vehicle steering wheel, comprising at least two adjacent parts connected together by at least one stitched connection seam,
   wherein:
   the seam between the two parts comprises at least two seam finishing stitches,
   a connection between the at least two adjacent parts comprising a connection portion free of stitching between the two finishing stitches so as to provide a distance between the two finishing stitches free of stitching, so as to allow the cover to be incised between the two finishing stitches to accommodate positioning of an insert within the composite cover without cutting either of the two finishing stitches.

2. The cover according to claim 1, wherein the seam between the two parts has a stitch length, and wherein the distance free of stitching is more than 1.5 times the stitch length.

3. The cover according to claim 1, wherein the distance free of stitching is at least 2 mm.

4. The cover according to claim 1, wherein the distance free of stitching is less than 8 mm.

5. The cover according to claim 1, wherein the connection has a connection direction transverse to a longitudinal direction of the cover.

6. The cover according to claim 1, wherein the connection portion free of stitching is made in the midst of the cover, and/or at a predetermined distance from longitudinal edges of the cover.

7. The cover according to claim 1, wherein the at least one stitched connection seam comprises two different stitched seams, separated by the connection portion free of stitching.

8. A vehicle steering wheel comprising:
a rim,
a cover according to claim 1,
the insert mounted on the rim and passing through the cover through a slot made in the cover,
wherein the slot runs between the two finishing stitches.

9. The steering wheel according to claim 8, wherein the insert is arranged along at least one portion of an arc of a circle of the rim.

10. An automotive vehicle comprising a steering wheel according to claim 8.

11. A method of manufacturing a composite cover for a vehicle steering wheel, the composite cover comprising two adjacent parts,
the manufacturing method comprising the steps of:
sewing the two adjacent parts together in order to form a stitched seam connection,
forming two finishing stitches, separated by a connection portion free of stitching providing a distance between the two finishing stitches free of stitching, so as to allow a subsequent incision of the cover between the two finishing stitches to accommodate positioning of an insert within the composite cover without cutting either of the two finishing stitches.

12. A method of manufacturing a steering wheel, comprising the manufacturing method of the composite cover according to claim 11, and comprising a step of making the incision in the cover, in the midst of the cover, running between the two finishing stitches and through the connection portion free of stitching.

13. The manufacturing method according to claim 12, comprising a step of mounting the insert on the rim, and making the insert pass through the incision.

* * * * *